(12) United States Patent
Kallal et al.

(10) Patent No.: US 9,148,201 B2
(45) Date of Patent: Sep. 29, 2015

(54) SYSTEMS AND METHODS FOR CALIBRATION OF A WIRELESS POWER TRANSMITTER

(75) Inventors: Edward Kenneth Kallal, San Diego, CA (US); Ryan Tseng, Coronado, CA (US)

(73) Assignee: QUALCOMM Incorporated, San Diego, CA (US)

(*) Notice: Subject to any disclaimer, the term of this patent is extended or adjusted under 35 U.S.C. 154(b) by 729 days.

(21) Appl. No.: 13/370,225

(22) Filed: Feb. 9, 2012

(65) Prior Publication Data

US 2012/0235506 A1 Sep. 20, 2012

Related U.S. Application Data

(60) Provisional application No. 61/442,059, filed on Feb. 11, 2011.

(51) Int. Cl.
*H02J 17/00* (2006.01)
*H04B 5/00* (2006.01)
*H02J 5/00* (2006.01)
*H02J 7/02* (2006.01)
*H04B 17/21* (2015.01)
*H04B 17/24* (2015.01)

(52) U.S. Cl.
CPC ............. *H04B 5/0037* (2013.01); *H02J 5/005* (2013.01); *H02J 7/025* (2013.01); *H02J 17/00* (2013.01); *H04B 5/0043* (2013.01); *H04B 5/0075* (2013.01); *H04B 17/21* (2015.01); *H04B 17/24* (2015.01)

(58) Field of Classification Search
None
See application file for complete search history.

(56) References Cited

U.S. PATENT DOCUMENTS

| 5,455,467 | A | 10/1995 | Young et al. |
|---|---|---|---|
| 7,647,176 | B2 | 1/2010 | Hayek et al. |
| 2006/0113955 | A1 | 6/2006 | Nunally |
| 2006/0255943 | A1 | 11/2006 | Hougen et al. |
| 2010/0181845 | A1 | 7/2010 | Fiorello et al. |
| 2010/0201189 | A1 | 8/2010 | Kirby et al. |
| 2011/0133726 | A1 | 6/2011 | Ballantyne et al. |
| 2011/0260681 | A1 | 10/2011 | Guccione et al. |

OTHER PUBLICATIONS

International Search Report and Written Opinion—PCT/US2012/024751—ISA/EPO—May 18, 2012.

*Primary Examiner* — Jared Fureman
*Assistant Examiner* — Aqeel Bukhari
(74) *Attorney, Agent, or Firm* — Knobbe Martens Olson & Bear LLP

(57) ABSTRACT

Systems and methods for alignment and calibration of a wireless power transmitter and a wireless power receiver are disclosed. According to one aspect, a wireless power transmit coil is first aligned with a wireless power receive coil. An alignment signal is received indicated that the transmit coil and the receive coil are aligned is received by the wireless power transmitter. A signal indicative of a characteristic of an electrical signal received by the wireless power receiver is generated and communicated to the wireless power transmitter. A calibration feedback signal is generated to adjust a driving signal of the wireless power transmitter based on the received signal.

33 Claims, 11 Drawing Sheets

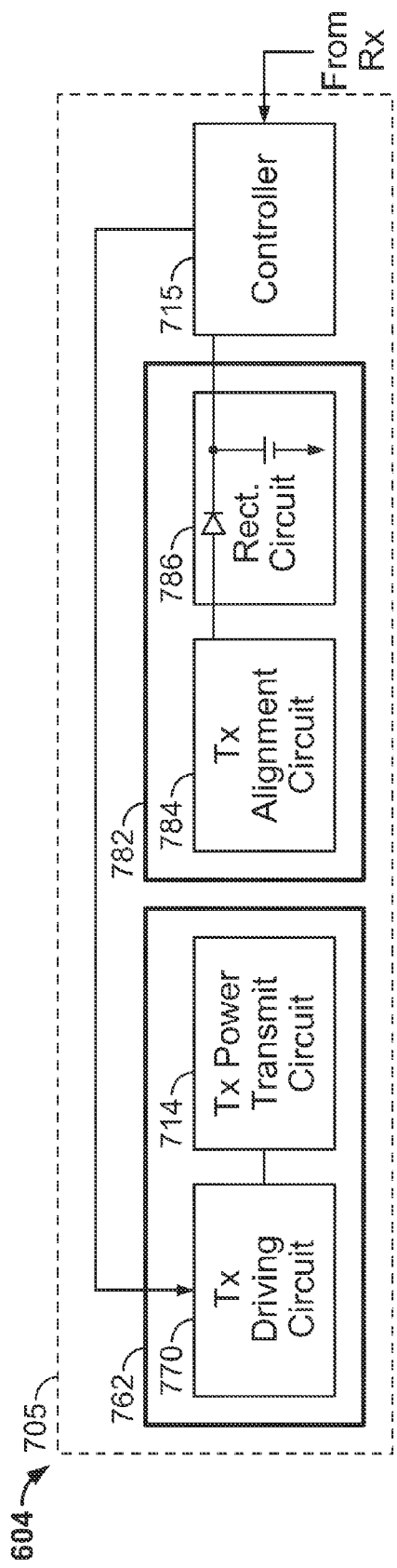
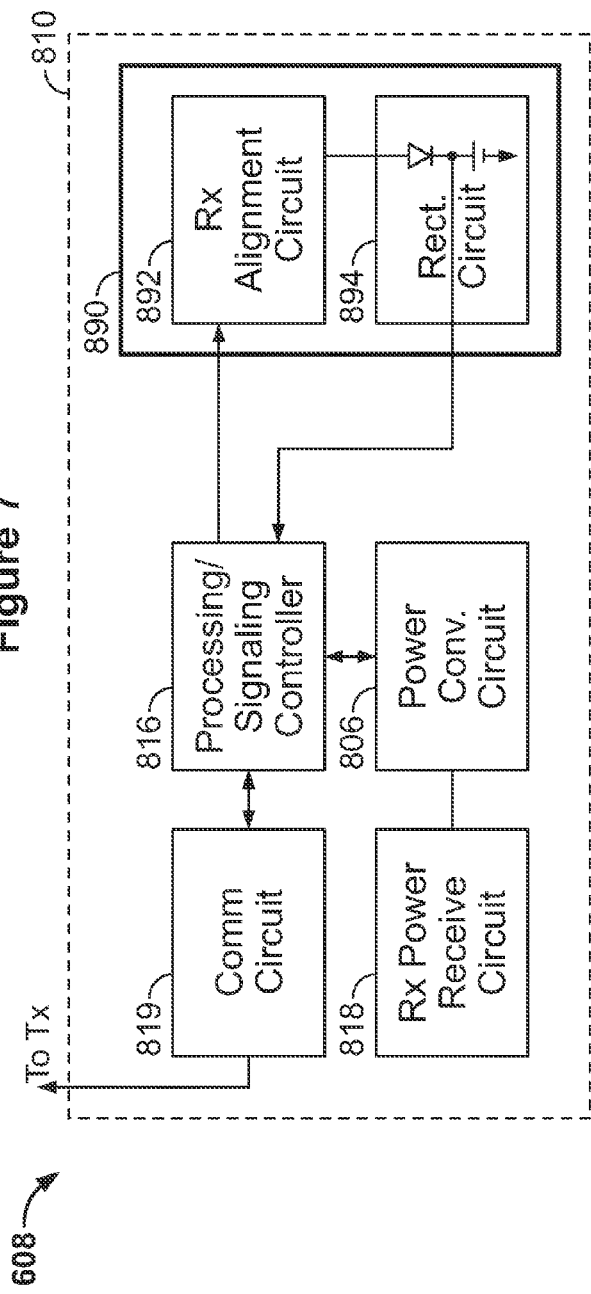
Figure 7
Figure 8

SYSTEMS AND METHODS FOR CALIBRATION OF A WIRELESS POWER TRANSMITTER

CROSS REFERENCE TO RELATED APPLICATIONS

This application claims priority benefit under 35 U.S.C. §119(e) to U.S. Provisional Patent Application No. 61/442,059 entitled "CALIBRATION RECEIVER FOR A VARIABLE TRANSMISSION DISTANCE WIRELESS POWER SYSTEM" filed on Feb. 11, 2011, the disclosure of which is hereby incorporated by reference in its entirety.

This invention was made with Government support under Award No. IIP-0945759 awarded by the National Science Foundation. The Government has certain rights in this invention.

FIELD

The present invention relates generally to wireless power. More specifically, the disclosure is directed to alignment of a wireless power receiver with a wireless power transmitter, and calibration of the wireless power transmitter.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power receiver including a wireless power receive coil, and a controller configured to receive an alignment signal indicative of an alignment of the receive coil with a transmit coil of a wireless power receiver. The wireless power transmitter generating a wireless field based on a driving signal, and when the alignment signal indicates that the transmit coil is substantially aligned with the receive coil, the controller is further configured to determine a characteristic of an electrical signal received by the wireless power receiver, and generate a feedback signal to adjust the driving signal based on the determined characteristic received by the wireless power receiver.

Another aspect of the disclosure provides a wireless power transmitter including a wireless power transmit coil, and a controller configured to receive an alignment signal indicative of an alignment of the transmit coil with a receive coil of a wireless power receiver. The transmit coil configured to generate a wireless field based on a driving signal, and when the alignment signal indicates that the transmit coil is substantially aligned with the receive coil, the controller is further configured to receive a signal indicative of a characteristic of an electrical signal received by the wireless power receiver, and generate a feedback signal to adjust the driving signal based on the received signal.

Another aspect of the disclosure provides a method of calibrating a wireless field including receiving power via a wireless field with a receive coil, the wireless field being generated by a transmit coil of a wireless power transmitter based on a driving signal, and receiving an alignment signal indicative of an alignment of the receive coil with the transmit coil. When the alignment signal indicates that the transmit coil is substantially aligned with the receive coil, the method further includes determining a characteristic of an electrical signal received by the wireless power receiver, and generating a feedback signal to adjust the driving signal based on the determined characteristic.

Another aspect of the disclosure provides a method for calibrating a wireless field including generating a wireless field using a transmit coil based on a driving signal to transmit power to a wireless power receive coil of a wireless power receiver, and receiving an alignment signal indicative of an alignment between the transmit coil and the receive coil. When the alignment signal indicates that the transmit coil is substantially aligned with the receive coil, the method further includes receiving a signal indicative of a characteristic of an electrical signal received by the wireless power receiver, and generating a feedback signal to adjust the driving signal based on the received signal.

Another aspect of the disclosure provides an apparatus for calibrating a wireless field including means receiving power via a wireless field, the wireless field being generated by a transmit coil of a wireless power transmitter based on a driving signal, and means for receiving an alignment signal indicative of an alignment of the means for receiving power with the transmit coil. When the alignment signal indicates that the transmit coil is substantially aligned with the means for receiving power, the apparatus further includes means for determining a characteristic of an electrical signal received by the wireless power receiver, and means for generating a feedback signal to adjust the driving signal based on the determined characteristic.

Another aspect of the disclosure provides an apparatus for calibrating a wireless field comprising means for generating a wireless field based on a driving signal to transmit power to a wireless power receive coil of a wireless power receiver, and means for receiving an alignment signal indicative of an alignment between the means for generating the wireless field and the receive coil. When the alignment signal indicates that the means for generating the wireless field is substantially aligned with the receive coil, the apparatus further includes means for receiving a signal indicative of a characteristic of an electrical signal received by the wireless power receiver, and means for generating a feedback signal to adjust the driving signal based on the received signal.

BRIEF DESCRIPTION OF THE DRAWINGS

FIG. 7 illustrates a partial block diagram of wireless power transmit circuitry included in a wireless power transmitter according to some embodiments.

FIG. 8 illustrates a partial block diagram of wireless power receive circuitry included in a wireless power receiver according to some embodiments.

Figure 1:
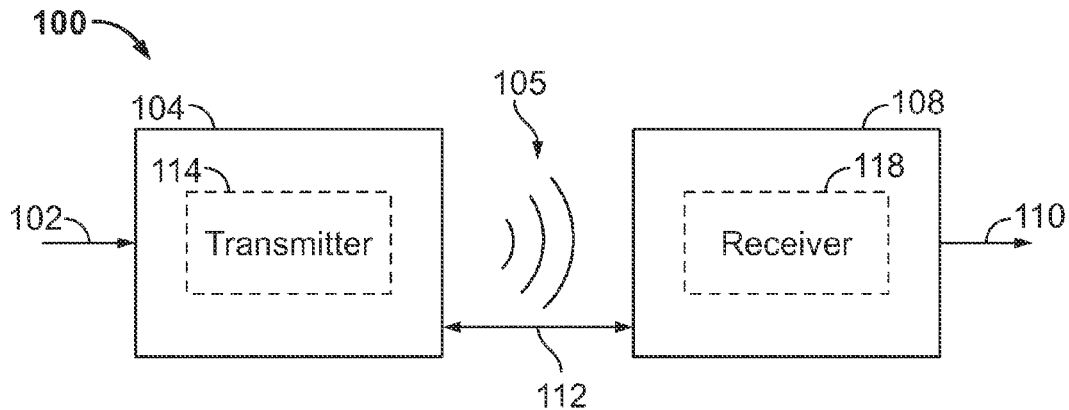
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram faun in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
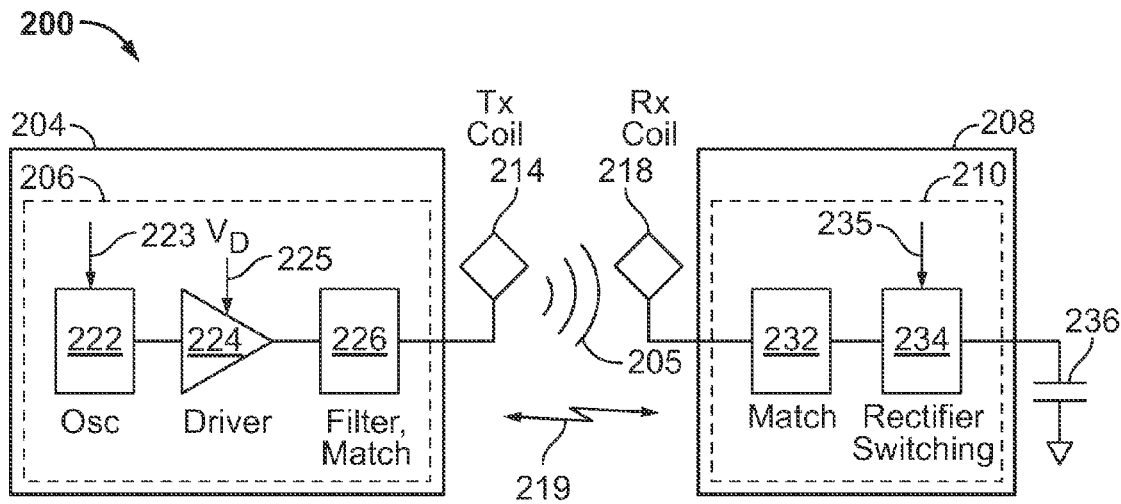
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have an associated load (e.g., battery 236) that is selectively capable of being disabled, may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field. Further, the communication device may be configured to utilize the received power to communicate with a transmitter 204 or other devices.

Figure 3:
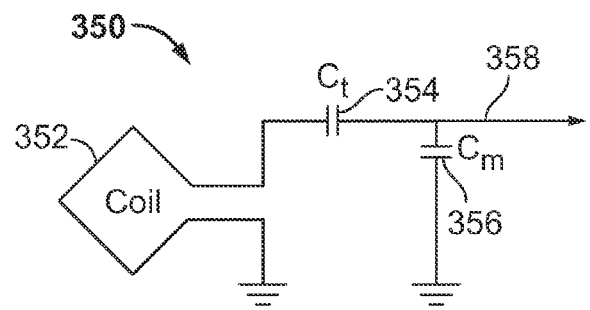
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
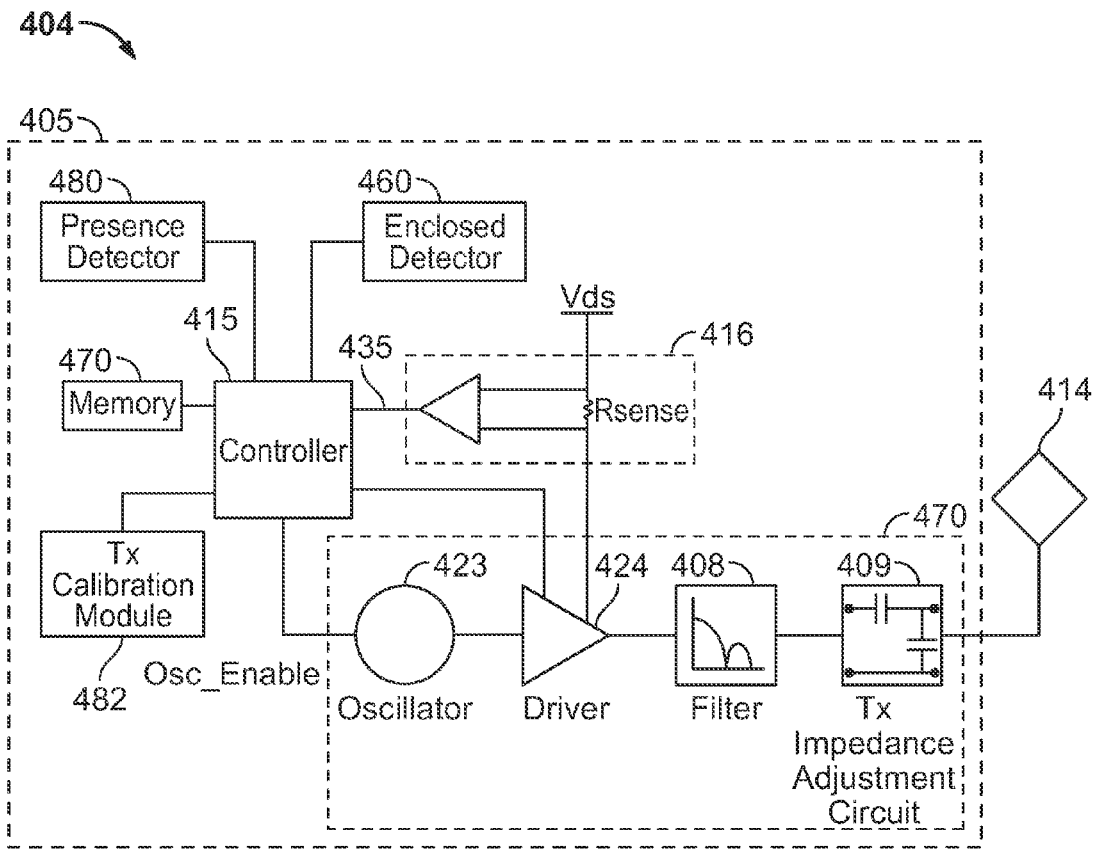
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 405 and a transmit coil 414. The transmit coil 414 may be the coil 352 as shown in FIG. 3. Transmit circuitry 405 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 405 may include a TX impedance adjustment circuit 409 for adjusting the impedance of the transmit circuitry 405 based on the impedance of the transmit coil 414 to increase efficiency. The transmit circuitry 405 may also include a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 405 further includes a driver circuit 424 configured to drive an RF signal as determined by an oscillator 423. The oscillator 423, driver 424, low pass filter 408 and impedance adjustment circuit 409 may be commonly referred to as transmitter driving circuit 470. The transmit circuitry 405 may be comprised of discrete devices or circuits, or alternately, may be comprised of an integrated assembly. An exemplary RF power output from transmit coil 414 may be on the order of 2.5 Watts.

Transmit circuitry 405 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 405 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 405 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
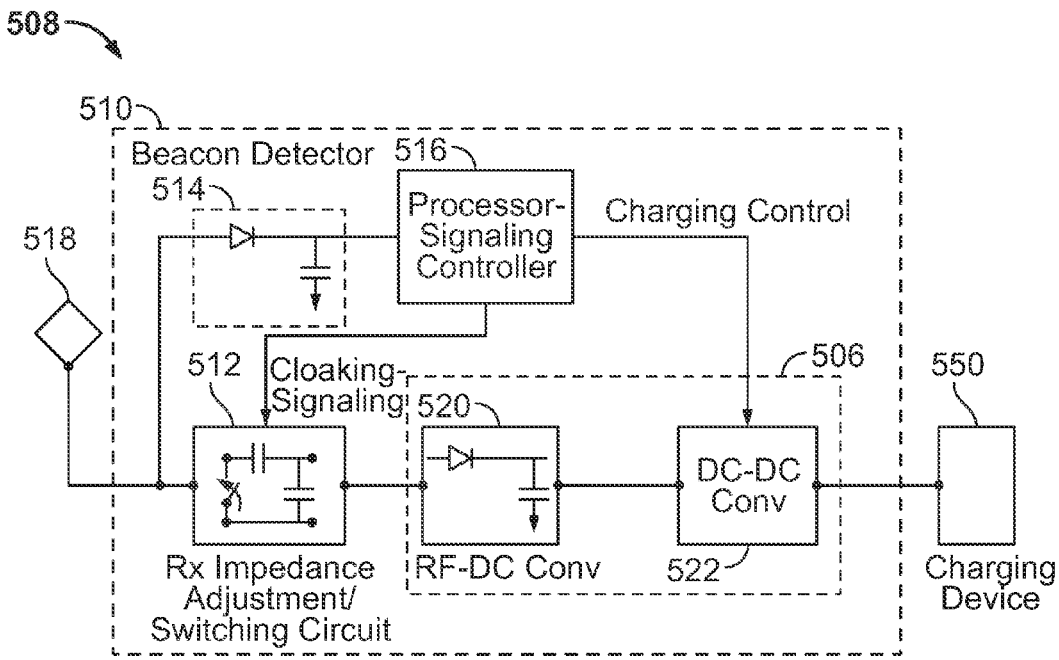
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550.

By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $L_{out}$. Various RF-to-DC converters are contemplated, including partial and full rectifiers, regulators, bridges, doublers, as well as linear and switching converters.

Receive circuitry 510 may further include Rx impedance adjustment and switching circuitry 512. The Rx impedance adjustment and switching circuit may be configured to adjust an impedance of the receive circuitry 510 based on an impedance of the receive coil 518 to improve efficiency during power transfer. Further, the Rx impedance adjustment and switching circuitry may be configured to connect receive coil 518 to the power conversion circuitry 506 or alternatively disconnect the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the Rx impedance adjustment and switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of the Rx impedance adjustment and switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6A:
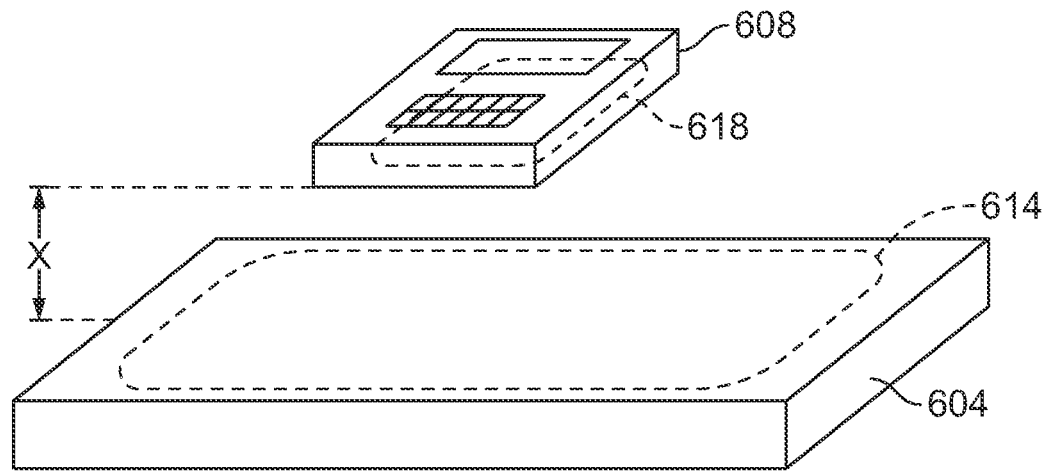
FIGS. 6A-6B illustrate example configurations of a wireless power receiver and a wireless power transmitter according to some embodiments.
Figure 6B:
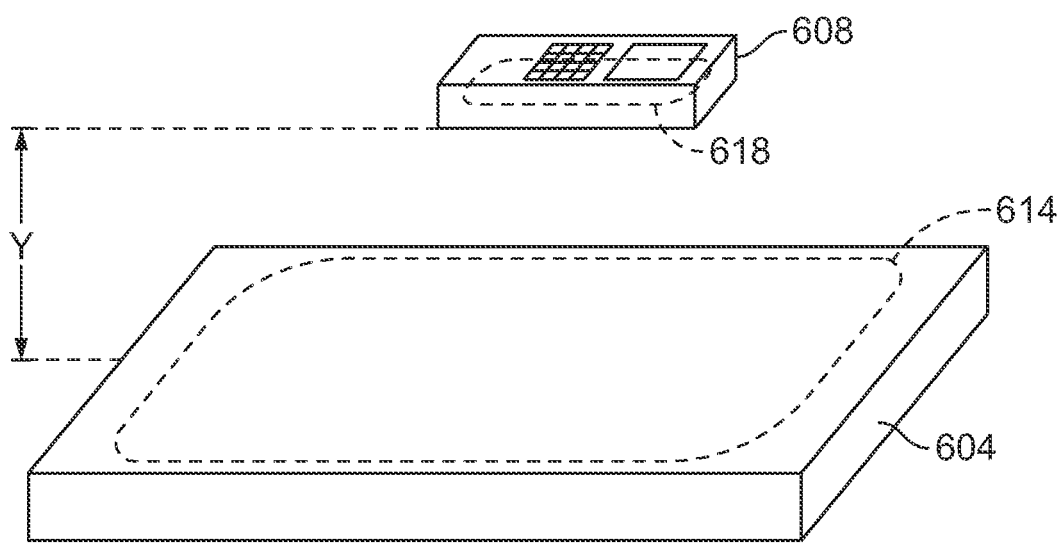

FIGS. 6A-6B illustrate example configurations of a wireless power receiver and a wireless power transmitter according to some embodiments. As shown in FIG. 6A, a wireless power receiver 608 may be configured to receive power via a wireless power receive coil 618 from a wireless power transmitter 604 including a wireless power transmit coil 614. FIG. 6B illustrates another example of a configuration of a wireless power receiver 608 configured to receive power from a wireless power transmitter 604. While not shown, the wireless power transmitter 604 may be integrated into a furnishing, for example, such as the underside of a desk or countertop. The thicknesses of various surfaces which may include an integrated wireless power transmitters 604 may vary. For example, as shown in FIG. 6A, a distance between a charging surface of the wireless power receiver 608 and a charging surface of a wireless power transmitter 604 may be equal to a distance X. In FIG. 6B, the distance between a charging surface of the wireless power receiver 608 and a charging surface of a wireless power transmitter 604 may be equal to a distance Y, where Y>X. The difference in distances Y and X may be due to the thickness of a surface separating an integrated wireless power transmitter 604 including the wireless power receive coil 614 and the wireless power receiver 608 including the wireless power receive coil 618.

For example, a wireless power transmitter 604 may be integrated into a surface of a desk or countertop, which are available in a wide variety of thickness ranging from about 10 mm to about 50 mm. Further, different types of wireless power receivers 608 may include an integrated wireless power receive coil 618 at different distances from a charging surface of the wireless power receiver 608. According to some embodiments, systems and methods are described for calibration of a wireless power transmitter 604 to meet charge port requirements of a device to be charged when a wireless power receiver 608 is placed at different distances from the charging surface of the wireless power transmitter 604.

For a given wireless power transmitter 604 design, as the separation from a transmitter 604 increases, a voltage and power received by a wireless power receiver 608 is reduced. Further, for a given design, as separation between the wireless power transmitter 604 and wireless power receiver 608 decreases, the voltage received by the wireless power receiver 608 increases and the device to be powered or charged may be subjected to greater electromagnetic field intensity. The higher voltages and elevated field intensities may damage the wireless power receiver 608 and a corresponding device to be powered or charged by the wireless power receiver.

Further, the voltage and power received by a wireless power receiver 604 is a function of the alignment of the wireless power receive coil 618 with the wireless power transmit coil 614. As discussed above, coupling between the wireless power receive coil 618 and the wireless power transmit coil 614 impacts the efficiency of power transferred from the wireless power transmitter 604 and the wireless power receiver 608 via the wireless field. A wireless power transmit coil 614 in proper alignment with a wireless power receive coil 618 exhibits greater coupling, and thereby more efficient power transfer, than a corresponding misaligned system. For example, as shown in FIG. 6A, the orientation and position of a wireless power receiver coil 618 relative to the orientation and position of the wireless power transmit coil 614 is different than the orientation and position of the wireless power receive coil 618 and the wireless power transmit coil 614 in FIG. 6B. As a result, coupling between the wireless power receive coil 618 and the wireless power 618 is different between the systems shown in FIGS. 6A and 6B.

According to some embodiments, a wireless power transmitter 604 may be calibrated based on the position of the wireless power transmitter 604 in relation to a wireless power receiver 608. The calibration of the wireless power transmitter 604 includes an alignment detection and adjustment mechanism. The calibration is performed following detection of alignment between the wireless power receive coil 618 and wireless power transmit coil 614. The components of the wireless power receiver 608 and the wireless power transmitter 604 for alignment and calibration of the wireless power system will be described in greater detail with reference to FIGS. 7-8 below.

FIG. 7 illustrates a partial block diagram of wireless power transmit circuitry included in a wireless power transmitter according to some embodiments. The wireless power transmit circuitry 705 may include a TX wireless field generating unit 762, including TX driving circuitry 770 and TX power transmit circuit 714. The TX driving circuitry 770 may be configured to generate a driving signal for driving the TX power transmit circuit 714 to generate the wireless field. For example, the TX driving circuitry 770 may correspond to the TX driving circuitry 470 as described above with reference to FIG. 4. The TX power transmit circuit 714 may include a resonant circuit (e.g., a coil coupled to a capacitor) configured to generate a wireless field based on the received driving signal. The wireless power transmit circuitry 705 also includes a TX alignment and calibration unit 782. The TX alignment and calibration unit 782 may include a TX alignment circuit 784 coupled to a rectification circuit 786. For example, the TX alignment circuit 784 include one or more sensing coils configured to receive an alignment signal transmitted from a wireless power receiver. The output of the TX alignment circuit 784 be rectified by the rectification circuit 786 to generate an alignment signal. A controller 715 may be configured to receive and process the alignment signal to determine if a wireless power transmit coil 614 is in alignment with the wireless power receive coil 618. Additionally, or alternatively, the controller 715 may be coupled to a communication interface (e.g., a communication antenna, not shown) and may be configured to receive a signal from the wireless power receiver 608 indicative of the alignment of the wireless power receiver coil 618 with a wireless power transmit coil 614.

Further, the controller 715 is configured to receive a signal from the wireless power receiver 608 indicative of a characteristic of an electrical signal received the wireless power receiver 608 as will be described in greater detail below with reference to FIG. 8. For example, the controller 715 may receive a signal indicating one or more of a voltage level and a current level received by the wireless power receiver 608. The controller 715 may be configured to generate a feedback signal to adjust the driving signal generated by the TX driving circuitry 770 based on received signal from the wireless power receiver 608 when the wireless power transmit coil 614 is determined to be in alignment with the wireless power receiver coil 618.

As discussed above, the TX driving circuit 770 may be configured to generate an AC voltage when a wireless power receiver 608 is placed within range of the wireless power transmitter 604 to generate the wireless filed. The controller 715, through feedback, may be configured to adjust an input voltage of a power supply coupled to the TX driving circuit 770. According to some embodiments, the controller 715 may also be used to adjust other parameters of a driving signal used to drive a coil of the wireless power transmitter 604. For example, the feedback signal may be configured to adjust one or more of the voltage level of a power supply, the current through the TX power transmit circuit 714 (e.g., current through a transmit coil), and the frequency of the driving signal. According to some embodiments, the adjustment of the field generated by the wireless power transmitter 604 may be performed by varying one or more of a capacitance and inductance of the wireless power transmitter 604 through the use of, for example, a variable impedance adjustment circuit similar to the TX impedance adjustment circuit 409 discussed above with reference to FIG. 4. According to some embodiments, the signal communicated from the controller 715 to other components of the wireless power transmit circuitry 705 is communicated via a wireless communication link. In some embodiments, calibration may be performed by signaling or displaying information to a user to perform a manual adjustment of the wireless power transmitter 604 driving signal based on one or more audio and visual cues that are generated by the controller 715.

FIG. 8 illustrates a partial block diagram of wireless power receive circuitry included in a wireless power receiver according to some embodiments. As shown in FIG. 8, the wireless power receive circuitry 810 may includes an Rx alignment unit 890 which includes an Rx alignment circuit 892 and a rectifier circuit 894. The Rx alignment circuit 892 may include, for example, one or more sensors configured to receive a signal from the wireless power transmitter 604. An example of Rx alignment circuit 892 will be described in greater detail with reference to FIG. 9 below. The rectification circuit 894 is configured to rectify the received signal and transmit an alignment signal to the processing and/or signaling controller 816. The processing and/or signaling controller 816 may perform similar functions to those performed by processing and/or signaling controller 516 as discussed above with reference to FIG. 5. As shown in FIG. 8, the processing and/or signaling controller 816 is coupled to a communication circuit 819 which is configured to communicate the alignment signal to the wireless power transmitter 604.

Further, the wireless power receive circuitry 810 also includes an Rx power receiver circuit 818 (e.g., a resonant circuit including a coil and a capacitor) and a power conversion circuit 806. The Rx power receive circuit 818 is configured to receive power from the wireless field generated by the wireless power transmitter 604, and the power conversion circuit 806 is configured to convert the received power to power for charging or operating a device. For example, the power conversion circuit 806 may include a rectification circuit configured to generate a DC current and/or DC voltage for powering a portable device based on an AC current induced in the Rx power receive circuit. The processing and/or signaling controller 816 is configured to receive a signal indicative of a characteristic of the electrical signal received by the Rx power receive circuit (e.g. a signal indicating at least one of a current level and voltage level received by the power conversion circuit 806) and communicate the information to the wireless power transmitter 604 through the communication circuit 819.

In some embodiments, the processing and/or signaling controller 816 may be configured to read one of the voltage level and current level generated by the power conversion circuit 806 and compare the voltage level or current level with a reference voltage level or current level respectively. The processing and/or signaling controller 816 may generate a feedback signal to adjust the driving signal of the TX driving circuit 770 as described above with reference to FIG. 7. Alternatively, the information may be transmitted to the controller 715 of the wireless power transmitter 604, and the controller 715 may be configured to generate the feedback signal. Further, the processing and/or signaling controller 816 may be configured to transmit identification information regarding the wireless power receiver 608. The wireless power transmitter 604 may include a memory (not shown) for storing the identification information regarding the wireless power receiver 608 along with values corresponding to the calibrated driving signal. The stored information may then be retrieved by the controller 715 to adjust the driving signal in the presence of a similar wireless power receiver 608. Additionally, or alternatively, the stored information may be used as a baseline for further calibration in the presence of a similar or different wireless power receiver 608.

Figure 9:
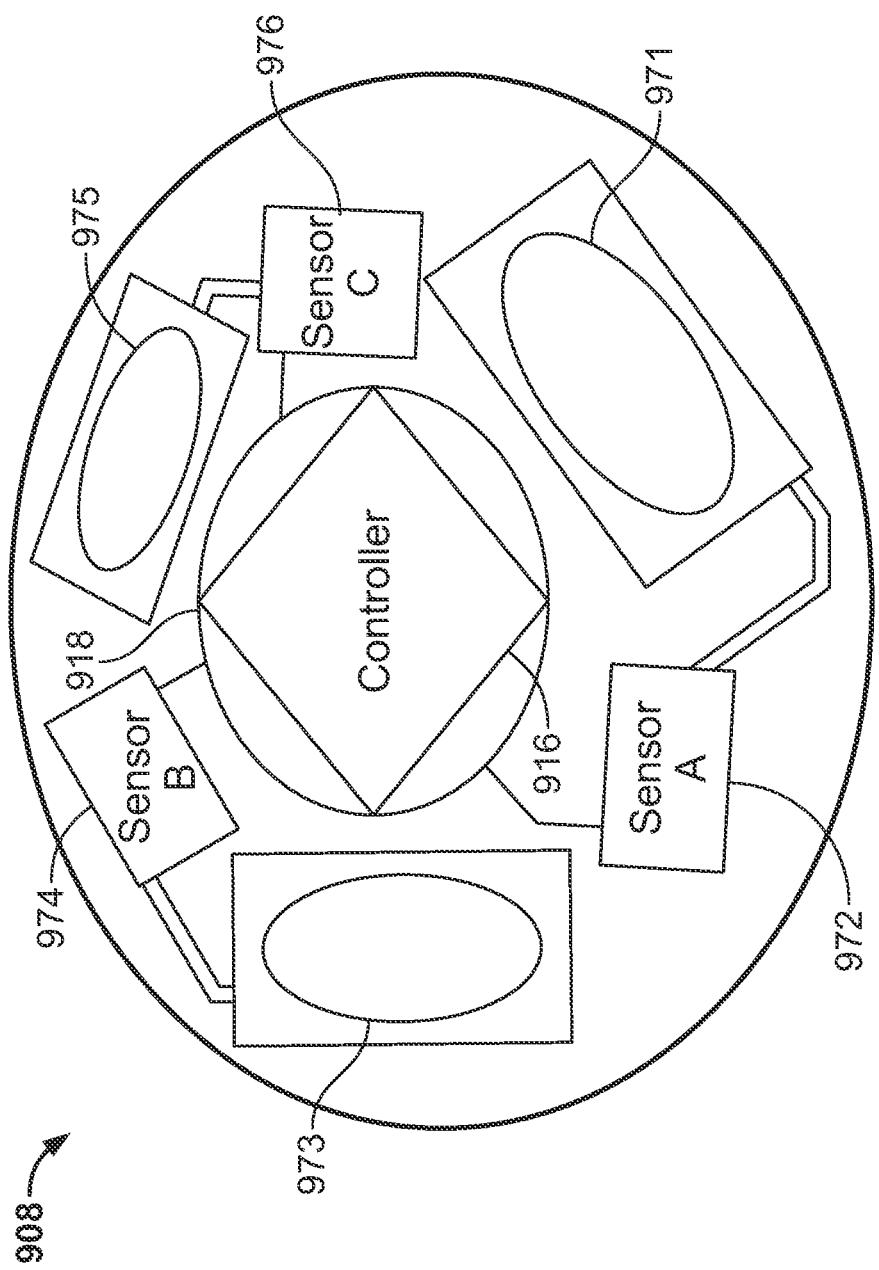
FIG. 9 illustrates a wireless power receiver including an alignment circuit according to some embodiments.

FIG. 9 illustrates a wireless power receiver including an alignment circuit according to some embodiments. In some embodiments, the wireless power receiver 908 may be configured as a calibration receiver to adjust the driving signal of a wireless power transmitter when separation between a wireless power receiver and a wireless power transmitter are unknown. The wireless power receiver 908 may also be configured to power or charge a load as described above with reference to wireless power receivers 108, 208, 408 and 608 above. The calibration system may adjust the driving signal used by the wireless power transmitter 604 in consideration of a correlation between a characteristic of an electrical signal (e.g., current level, voltage level, etc.) received by the wireless power receiver 908, and the ability of the wireless power receiver 608 to meet charge port requirements for powering or charging an associated load. As discussed above with reference to FIGS. 6A-6B, the correlation may be performed when a wireless power receive coil is properly aligned with a wireless power transmit coil Therefore, to avoid aliasing and ensure proper calibration, the wireless power receive coil 918 is aligned with a wireless power transmit coil before the calibration process can occur.

As illustrated in FIG. 9, the wireless power receiver 908 includes three sensing coils 971, 973, and 975 which are spaced 120 degrees apart in polar coordinates and equidistant from a center point of the wireless power receive coil 918. Each of the sensing coil 971, 973, and 975 may be coupled to first, second and third sensing circuits 972, 974, and 976 respectively. A controller 916 may be configured to receive first, second, and third sensing signals from the sensing circuits 972, 974, and 976.

The alignment system may take into account the relationship between the position of a sensing coil (e.g., sensing coils 971, 974, and 977) included in a wireless power receiver 908 and induced current and/or voltage. For example, for a uniform circular wireless power transmit coil and a constant vertical separation between a wireless power transmitter and the wireless power receiver 908, the induced voltage on a sensing coil is a function of distance from the center of the wireless power transmit coil to the sensing coil. Therefore, multiple sensing coils, such as substantially identical coils, in the same plane and placed equidistant from a wireless power transmit coil will exhibit the substantially same induced current and/or voltage.

Since the same current and/or voltage will be induced on the sensing coils 971, 973, and 975 when they are equidistant from the center of a uniform, circular transmit coil, monitoring of the sensing signals generated by the sensing circuits 972, 974, and 976 can ensure alignment between the center of a wireless power transmit coil and the center of the wireless power receive coil 918. In some embodiments, the wireless power receiver 908 may be determined to be aligned with a wireless power transmitter when a voltage or current received on each of the sensing coils 971, 973, and 975 is above a threshold value, and the voltage or current on each 971, 973, and 975 is substantially equal. An example method of determining alignment of the wireless power receiver 908 will be described in greater detail with reference to FIG. 12 below.

Figure 10:
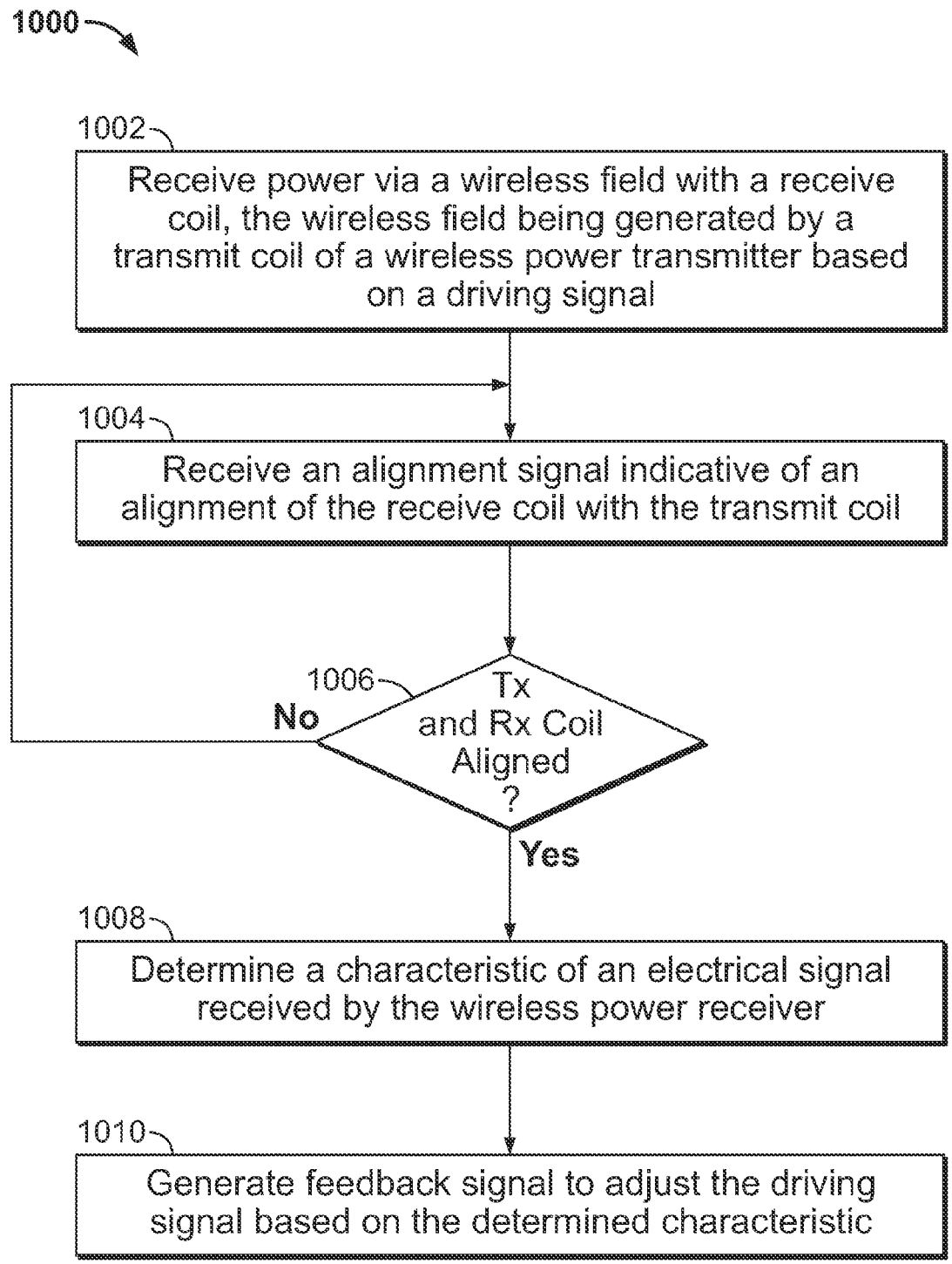
FIG. 10 is a flowchart of a method for alignment and calibration of a wireless power transmitter according to some embodiments.

FIG. 10 is a flowchart of a method for alignment and calibration of a wireless power transmitter according to some embodiments. As illustrated in FIG. 10, the method 1000 includes receiving power via a wireless field with a receive coil, the wireless field being generated by transmit coil of wireless power transmitter based on a driving signal as shown in block 1002. For example, the transmit coil may be included as part of a TX power transmit circuit 714 as described above with reference to FIG. 7, and the receive coil may be included in an Rx power receiver circuit 818 as described above with reference to FIG. 8. The method further includes receiving alignment signal indicative of an alignment of the receive coil with transmit coil as shown by block 1004. The receive signal may be generated by a sensor included in one of the TX alignment circuit 784 and/or Rx alignment circuit 892 as discussed above with reference to FIGS. 7-8. At decision block 1006, the method may determine whether the TX and Rx coils are aligned based on the received signal. If it is determined that the TX and Rx coils are not aligned the method continues to monitor an alignment signal as shown by block 1004. In some embodiments, the method may include generating or displaying an indicator of the alignment between the TX and Rx coils such that the alignment can be automatically adjusted or adjusted by a user. If it is determined that the TX and Rx coils are aligned, the method proceeds to block 1008 where a characteristic of an electrical signal received by the wireless power receiver is determined. For example, the characteristic may include one of a voltage and current received by and Rx power receiver circuit 818 and power conversion circuit 806 as discussed above with reference to FIG. 8. The method then proceeds to block 1010, where a feedback signal is generated to adjust the driving signal based on the determined characteristic. For example, as discussed above, the feedback signal may be configured to adjust one of the voltage level of the driving signal, the frequency of the driving signal, and/or adjust the driving signal to adjust the current through wireless power transmit coil.

Figure 11:
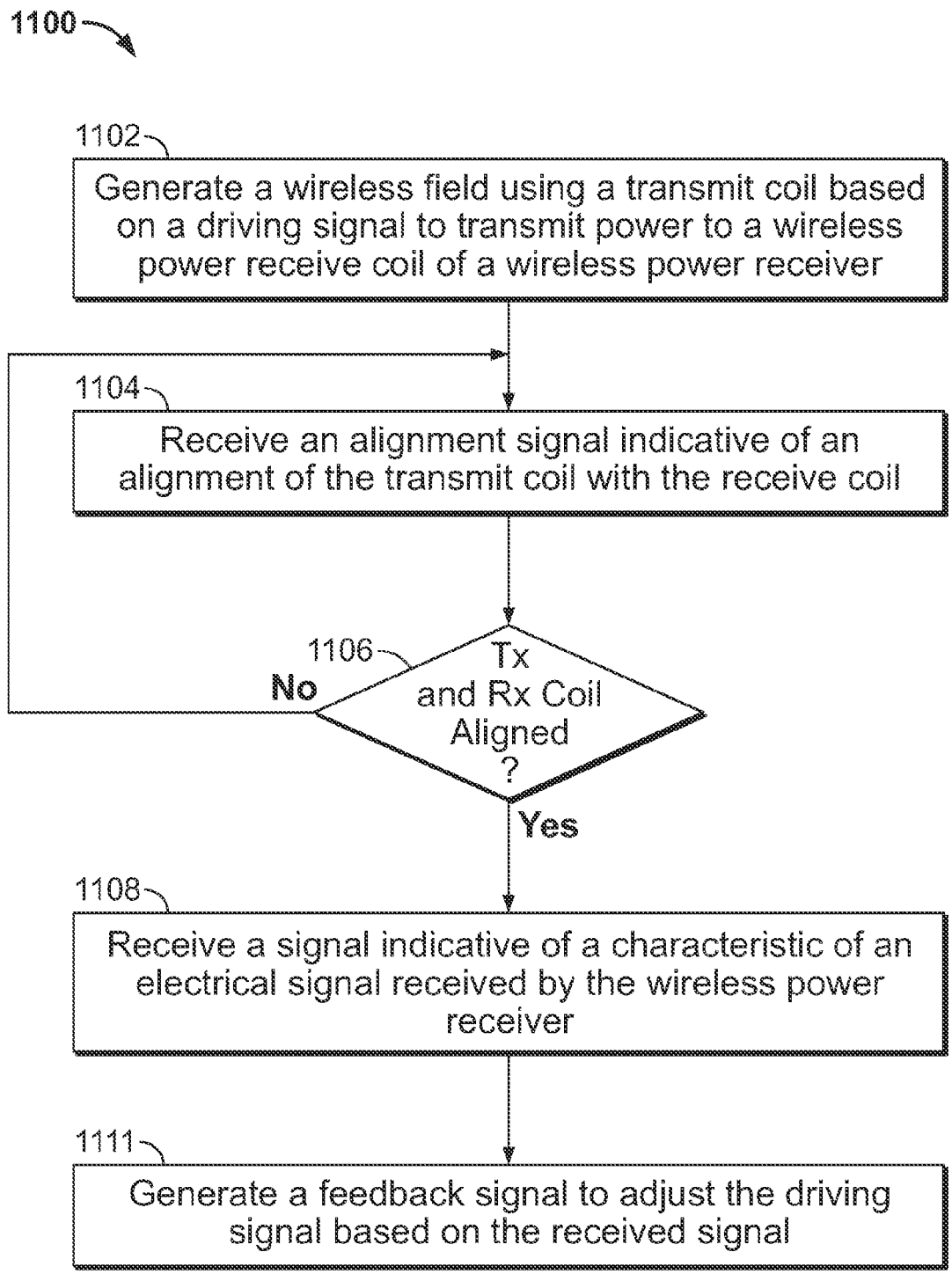
FIG. 11 is a flowchart of a method for alignment and calibration of a wireless power transmitter according to some embodiments.

FIG. 11 is a flowchart of a method for alignment and calibration of a wireless power transmitter according to some embodiments. As illustrated in FIG. 11, the method 1100 includes generating a wireless field with a transmit coil based on a driving signal to transmit power to a wireless power receive coil of a wireless power receiver as shown in block 1102. For example, the transmit coil may be included as part of a TX power transmit circuit 714 as described above with reference to FIG. 7, and the receive coil may be included in an Rx power receiver circuit 818 as described above with reference to FIG. 8. The method further includes receiving an alignment signal indicative of an alignment of the receive coil with transmit coil as shown by block 1104. The received signal may be generated by a sensor included in one of the TX alignment circuit 784 and/or Rx alignment circuit 892 as discussed above with reference to FIGS. 7-8. At decision block 1106, the method may determine whether the TX and Rx coils are aligned based on the received signal. If it is determined that the TX and Rx coils are not aligned the method continues to monitor an alignment signal as shown by block 1104. In some embodiments, the method may include generating or displaying an indicator of the alignment between the TX and Rx coils such that the alignment can be automatically adjusted or adjusted by a user. If it is determined that the TX and Rx coils are aligned, the method proceeds to block 1108 where a signal indicative of a characteristic of an electrical signal received by the wireless power receiver is received. For example, the characteristic may include one of a voltage and current received by and RX power receiver circuit 818 and power conversion circuit 806 and communicated to the wireless power transmitter 604 as discussed above with reference to FIG. 8. The method then proceeds to block 1110, where a feedback signal is generated to adjust the driving signal based on the determined characteristic. For example, as discussed above, the feedback signal may be configured to adjust one of the voltage level of the driving signal, the frequency of the driving signal, and/or adjust the driving signal to adjust the current through the wireless power transmit coil.

Figure 12:
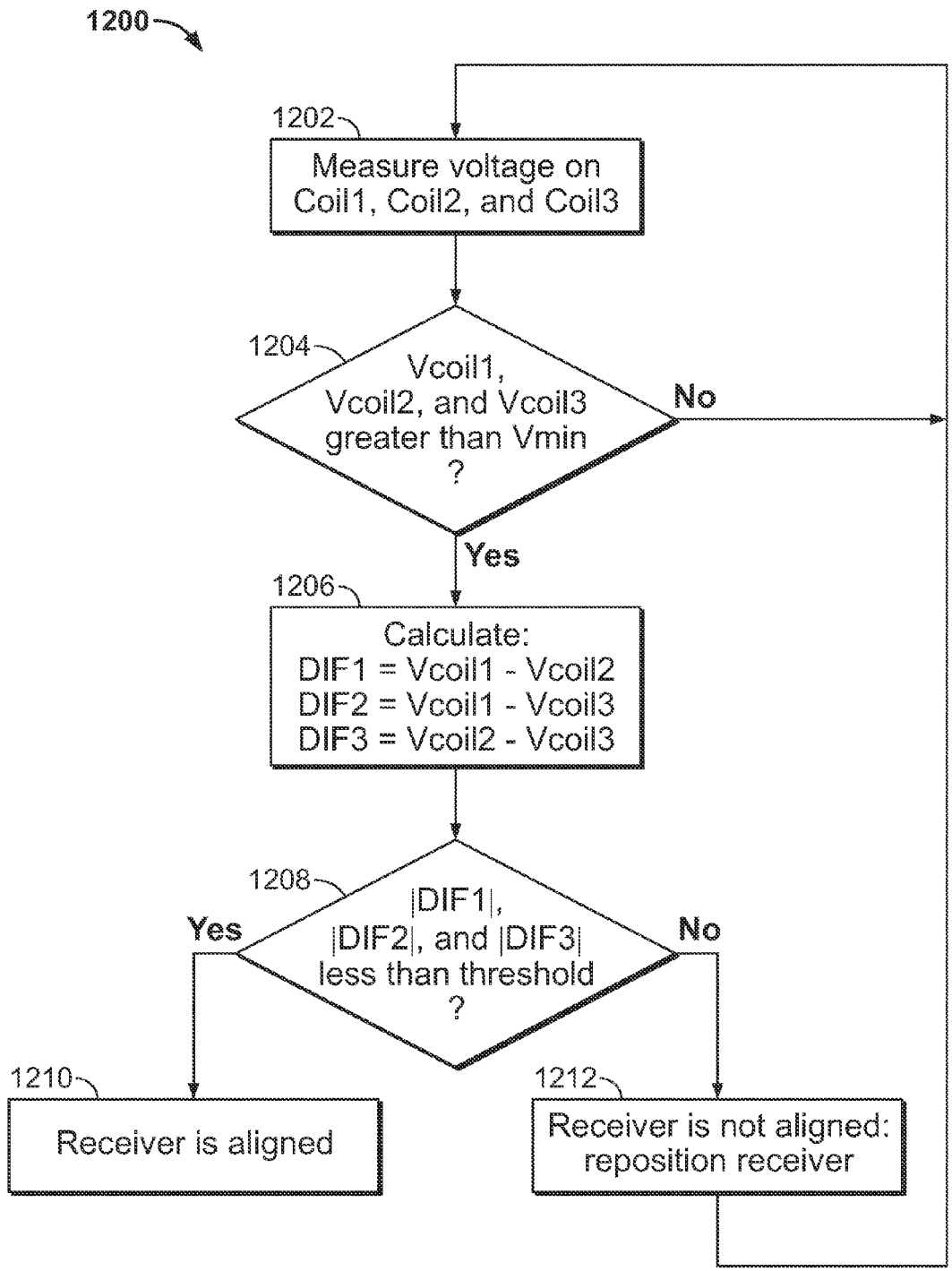
FIG. 12 is a flowchart of a method for aligning a wireless power transmitter and a wireless power receiver according to some embodiments.

FIG. 12 is a flowchart of a method for aligning a wireless power transmitter and a wireless power receiver according to some embodiments. The method 1200 includes measuring voltage on first through third coils of a wireless power receiver as shown in block 1202. For example, method may include measuring voltage induced on first, second, and third sensing coils 971, 973, and 975 as discussed above with reference to FIG. 9. At decision block 1204, each of the measured voltages Vcoil1, Vcoil2, and Vcoil3 are compared to a threshold value (Vmin). If the voltages are less than the threshold value, the method returns to block 1202 where the voltage of each of the sensing coils is continued to be monitored. If the voltages are greater than the threshold value, the method proceeds to calculate a difference of each pair of voltages as shown in block 1206. As shown, DIF1=Vcoil1−Vcoil2, DIF2=Vcoil1−Vcoil3, and DIF3=Vcoil2−Vcoil3. The method then proceeds to decision block 1208 where an absolute value of each of the difference values (|DIF1|, |DIF2|, and |DIF3|) are compared to a threshold value. If each of the difference values is greater in magnitude than the threshold value, and the receiver is determined to be misaligned and the receiver is repositioned, either manually or automatically, as shown in block 1212. If each of the difference values is less in magnitude than the threshold value, then the receiver is determined to be aligned as shown in block 1210.

Figure 13:
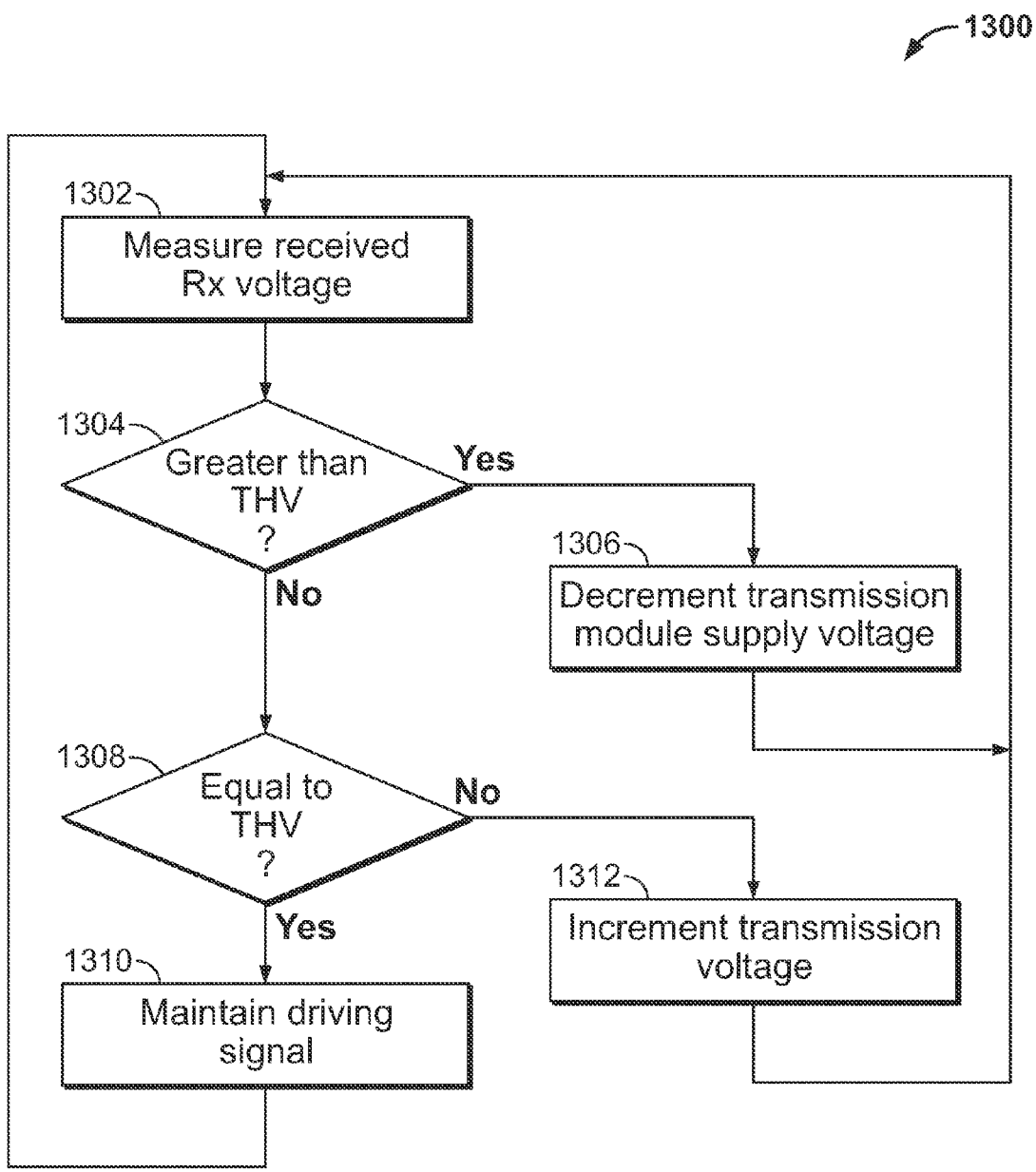
FIG. 13 is a flowchart of a method for calibrating a wireless power transmitter according to some embodiments.

FIG. 13 is a flowchart of a method for calibrating a wireless power transmitter according to some embodiments. The method 1300 may be performed following the termination that the wireless power receiver is in alignment with the wireless power transmitter. The method 1300 includes measuring a voltage received by wireless power receiver as shown in block 1302. At decision block 1304, method compares the measured voltage with a threshold voltage. If the measured voltage is greater than the threshold voltage, the method proceeds to decrement the transmission module supply voltage as shown in block 1306. For example, as discussed above with reference to FIGS. 7 and 8, a feedback signal may be generated to adjust a driving signal produced by a TX driving circuit 770. As shown at decision block 1308 if the measured voltage is equal to the threshold voltage, the method proceeds to maintain the driving signal. If the measured voltage is both less than been not equal to the threshold voltage, the method proceeds to block 1312 to increment the transmission voltage level.

The example methods described above with reference to FIGS. 12 and 13 are based on voltage measurement calculations. However, the embodiments described herein are not limited thereto. For example, as discussed above, a current level induced in one or more sensing coils may be used to determine the alignment of a wireless power receiver and wireless power transmitter according to a similar method to that described in FIG. 12. Further, the current level received by the wireless power receiver may be compared to a threshold value in order to generate feedback signal for adjusting driving signal similar to the method described with reference to FIG. 13.

Figure 14:
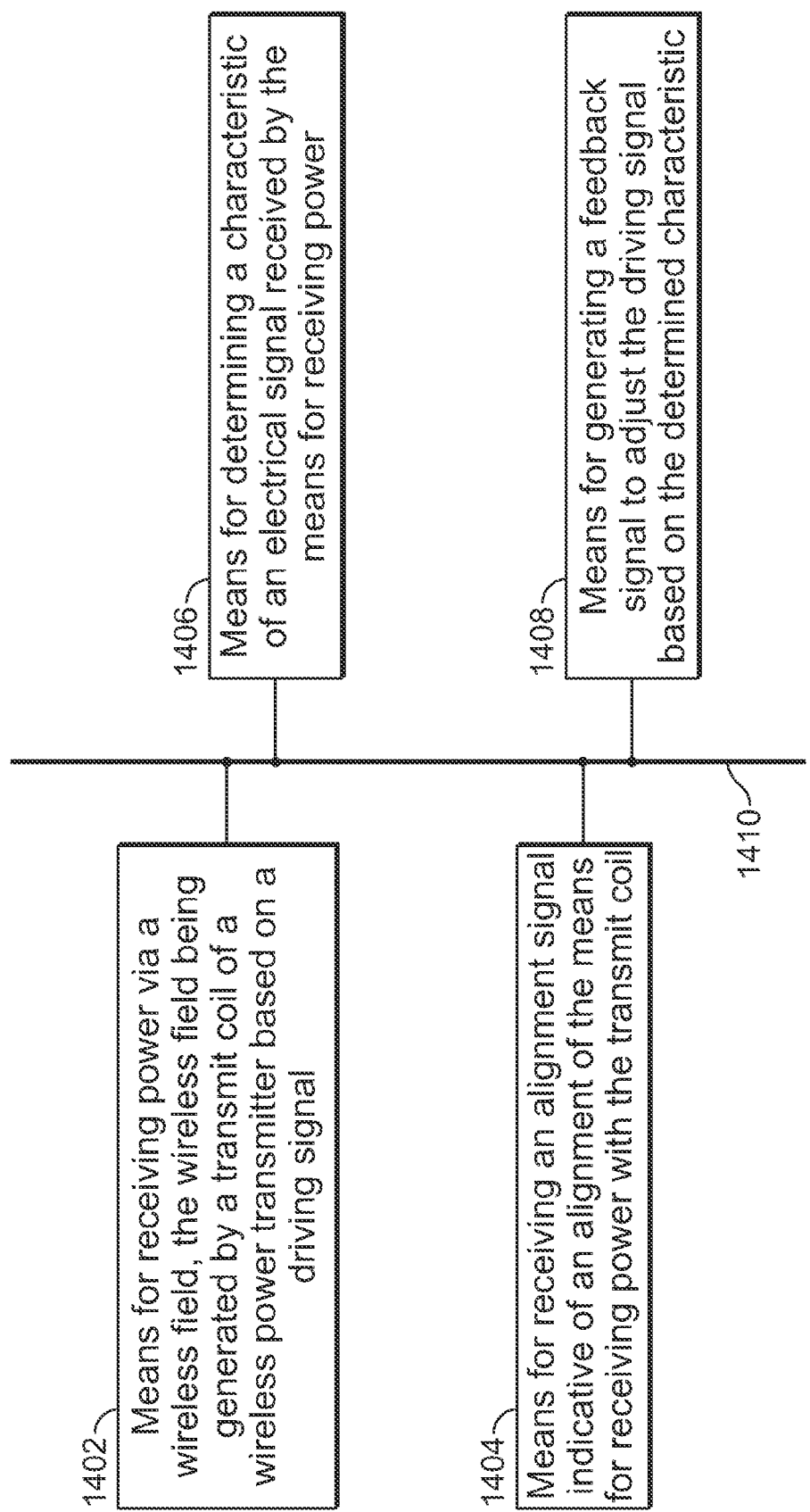
FIG. 14 is a functional block diagram of an apparatus of a wireless power receiver according to some embodiments.

FIG. 14 is a functional block diagram of an apparatus of a wireless power receiver according to some embodiments. As shown in FIG. 14, the apparatus includes means for receiving power via a wireless field wireless field being generated by transmit coil of a wireless power transmitter based on driving signal as shown in block 1402. For example, the means for receiving power 1402 may correspond to the Rx power receiver circuit 818 and the power conversion circuit 806. The Rx power receive circuit 818 may include a resonant circuit having a receive coil coupled to a capacitor. The apparatus further includes means for receiving an alignment signal indicative of an alignment of the means for receiving power with the transmit coil as shown in block 1404. The apparatus further includes a means for determining a characteristic of electrical signal received by the means for receiving power as shown by block 1406, and a means for generating feedback signal to adjust the driving signal based on the determined characteristic as shown at block 1408. For example, the means for receiving alignment signal 1404, the means for determining a characteristic of an electrical signal 1406, and the means for generating a feedback signal 1408 may correspond to a processing and/or signaling controller 816 as described with reference to FIG. 8 above. Each of the components of the apparatus shown in FIG. 14 may be configured to communicate through a communication bus 1410.

Figure 15:
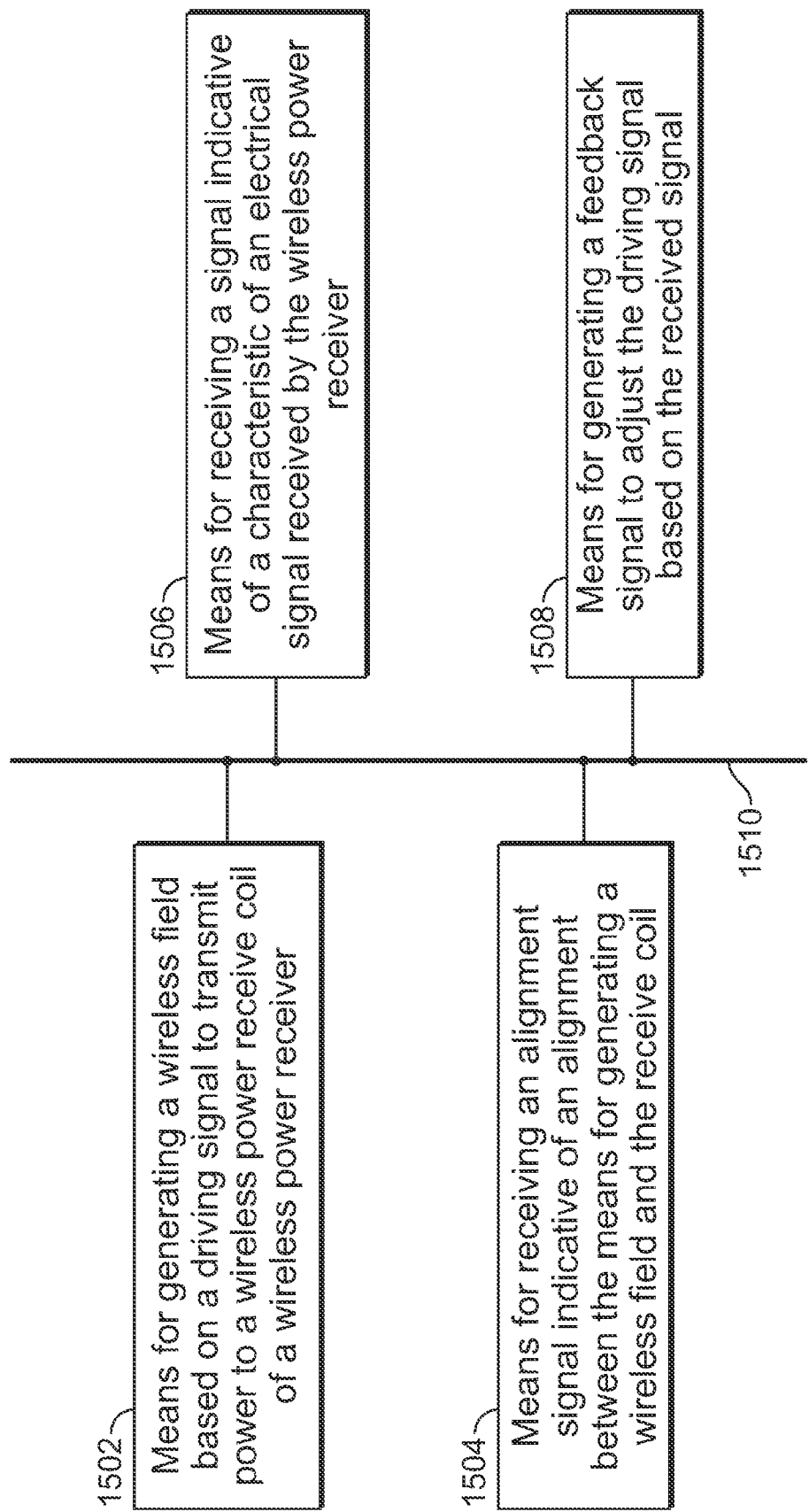
FIG. 15 is a functional block diagram of an apparatus of a wireless power transmitter according to some embodiments.

FIG. 15 is a functional block diagram of an apparatus of a wireless power transmitter according to some embodiments. As shown in FIG. 15, the apparatus includes means for generating a wireless field based on a driving signal to transmit power to a wireless power receive coil of a wireless power receiver as shown by block 1502. For example, the means for generating a wireless field 1502 may correspond to the TX wireless field generating unit 762 as described above with reference to FIG. 7. The apparatus further includes means for receiving an alignment signal indicative of an alignment of the means for generating a wireless field with the transmit coil as shown in block 1504. The apparatus further includes a means for receiving a signal indicative of a characteristic of an electrical signal received by the wireless power receiver as shown by block 1506, and a means for generating feedback signal to adjust the driving signal based on the determined characteristic as shown at block 1508. For example, the means for receiving the alignment signal 1504, the means for receiving a signal indicative of a characteristic of an electrical signal 1506, and the means for generating a feedback signal 1508 may correspond to a controller 715 as described with reference to FIG. 7 above. Each of the components of the apparatus shown in FIG. 15 may be configured to communicate through a communication bus 1510.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power receiver for receiving wireless power via a wireless field, the wireless power receiver comprising:
   a wireless power receive coil configured to receive the wireless power; and
   a controller configured to receive an alignment signal indicative of an alignment of the receive coil with a transmit coil of a wireless power transmitter, and when the alignment signal indicates that the transmit coil is substantially aligned with the receive coil, the controller is further configured to:
      determine a characteristic of an electrical signal received by the wireless power receive coil; and
      generate a feedback signal to adjust a driving signal based on the determined characteristic of the electrical signal.

2. The wireless power receiver of claim 1, wherein the characteristic includes a voltage of the electrical signal received by the wireless power receiver.

3. The wireless power receiver of claim 1, wherein the characteristic includes a current of the electrical signal received by the wireless power receiver.

4. The wireless power receiver of claim 1, further comprising a sensor configured to generate the alignment signal.

5. The wireless power receiver of claim 4, wherein the sensor includes a plurality of sensing coils positioned about the receive coil.

6. The wireless power receiver of claim 4, wherein the sensor includes a first sensing coil, a second sensing coil, and a third sensing coil positioned within a plane about the receive coil.

7. The wireless power receiver of claim 6, wherein the first sensing coil, the second sensing coil, and the third sensing coil are displaced by about 120 degrees from one another along the plane.

8. The wireless power receiver of claim 6, wherein the sensor is configured to generate the alignment signal when a voltage measured at each of first sensing coil, the second sensing coil, and the third sensing coil is greater than a first threshold, and a difference of the voltage measured at each of the first sensing coil, the second sensing coil, and the third sensing coil is less than a second threshold.

9. The wireless power receiver of claim 1, further comprising a regulator configured to generate a signal at a voltage level for charging a load.

10. A wireless power transmitter for transferring wireless energy via a wireless field, the wireless power transmitter comprising:
a wireless power transmit coil configured to generate the wireless field; and
a controller operationally coupled to the wireless power transmit coil and configured to receive an alignment signal indicative of an alignment of the transmit coil with a receive coil of a wireless power receiver, and when the alignment signal indicates that the transmit coil is substantially aligned with the receive coil, the controller is further configured to:
receive a signal indicative of a characteristic of an electrical signal received by the wireless power receiver; and
generate a feedback signal to adjust the a driving signal based on the received signal.

11. The wireless power transmitter of claim 10, wherein the characteristic includes a voltage of the electrical signal received by the wireless power receiver.

12. The wireless power transmitter of claim 10, wherein the characteristic includes a current of the electrical signal received by the wireless power receiver.

13. The wireless power transmitter of claim 10, further comprising a sensor configured to generate the alignment signal.

14. The wireless power transmitter of claim 10, further comprising an impedance adjustment circuit, and wherein the impedance adjustment circuit is configured to adjust an impedance of the wireless power transmitter based on the feedback signal.

15. The wireless power transmitter of claim 10, wherein the feedback signal is configured to adjust at least one of a voltage level and frequency of the driving signal.

16. The wireless power transmitter of claim 10, further comprising a memory coupled to the controller, and wherein the controller is configured to store parameters regarding the driving signal in the memory.

17. The wireless power transmitter of claim 16, wherein the controller is configured to receive identification information corresponding to the wireless power receiver, and wherein the controller is configured to store the identification information along with the parameters regarding the driving signal in the memory.

18. A method of calibrating a wireless field comprising:
receiving power via the wireless field with a receive coil, the wireless field generated by a transmit coil of a wireless power transmitter based on a driving signal;
receiving an alignment signal indicative of an alignment of the receive coil with the transmit coil, and when the alignment signal indicates that the transmit coil is substantially aligned with the receive coil, the method further comprising:
determining a characteristic of an electrical signal received by the receive coil; and
generating a feedback signal to adjust the driving signal based on the determined characteristic of the electrical signal.

19. The method of claim 18, wherein the characteristic includes a voltage received by the wireless power receiver.

20. The method of claim 18, wherein the characteristic includes a current received by the wireless power receiver.

21. The method of claim 18, further comprising measuring a plurality of sensing signals indicative of an electrical signal characteristic received by a plurality of alignment sensing coils; determining a plurality of difference values equal to the difference in magnitude of each of the plurality of sensing signals; and determining that the transmit coil is in alignment with the receive coil when each of the difference values is less than a first threshold value.

22. The method of claim 21, further comprising comparing each of the plurality of sensing signals with a second threshold value prior to calculating the difference values.

23. A method for calibrating a wireless field comprising:
generating the wireless field using a transmit coil based on a driving signal to transmit power to a wireless power receive coil of a wireless power receiver;
receiving an alignment signal indicative of an alignment between the transmit coil and the receive coil, and when the alignment signal indicates that the transmit coil is substantially aligned with the receive coil, the method further comprising:
receiving a signal indicative of a characteristic of an electrical signal received by the wireless power receiver; and
generating a feedback signal to adjust the driving signal based on the received signal.

24. The method of claim 23, wherein the characteristic includes a voltage received by the wireless power receiver.

25. The method of claim 23, wherein the characteristic includes a current received by the wireless power receiver.

26. The method of claim 23, further comprising adjusting an impedance of the wireless power transmitter based on the feedback signal.

27. The method of claim 23, further comprising adjusting at least one of a voltage level and frequency of the driving signal.

28. The method of claim 23, further comprising storing parameters regarding the driving signal in a memory.

29. The method of claim 28, further comprising receiving identification information corresponding to the wireless power receiver; and storing the identification information along with the parameters regarding the driving signal in the memory.

30. An apparatus for receiving wireless power via a wireless field, the apparatus comprising:
means for receiving the wireless power via the wireless field;
means for receiving an alignment signal indicative of an alignment of the means for receiving power with a transmit coil, and when the alignment signal indicates that the transmit coil is substantially aligned with the means for receiving power, the apparatus further comprising:
means for determining a characteristic of an electrical signal received by the means for receiving the wireless power; and
means for generating a feedback signal to adjust a driving signal based on the determined characteristic of the electrical signal.

31. The apparatus of claim 30, wherein the means for receiving power comprises a receive coil, and wherein the means for receiving an alignment signal, the means for determining a characteristic of an electrical signal, and the means for generating a feedback signal comprise a controller.

32. An apparatus for transferring wireless power via a wireless field, the apparatus comprising:

means for generating the wireless field based on a driving signal to transmit the wireless power to a wireless power receive coil of a wireless power receiver;

means for receiving an alignment signal indicative of an alignment between the means for generating the wireless field and the receive coil, and when the alignment signal indicates that the means for generating the wireless field is substantially aligned with the receive coil, the means for receiving the alignment signal further configured to:

receive a signal indicative of a characteristic of an electrical signal received by the wireless power receiver; and generate a feedback signal to adjust the driving signal based on the received signal.

33. The apparatus of claim 32, wherein the means for generating the wireless field comprises a transmit coil, and wherein the means for receiving an alignment signal, the means for determining a characteristic of an electrical signal, and the means for generating a feedback signal comprise a controller.

\* \* \* \* \*